United States Patent [19]
Kraus et al.

[11] 3,987,492
[45] Oct. 19, 1976

[54] LIQUID JET RECORDER
[75] Inventors: Helmut Kraus, Erlangen; Siegfried Wiesmüller, Grossgrundlach, both of Germany
[73] Assignee: Siemens Aktiengesellschaft, Erlangen, Germany
[22] Filed: Sept. 27, 1974
[21] Appl. No.: 510,017

[30] Foreign Application Priority Data
  Oct. 1, 1973 Germany............................ 2349340

[52] U.S. Cl..................................... 346/75; 358/75
[51] Int. Cl.² ..................... G01D 15/18; B41J 3/04
[58] Field of Search ............... 346/75, 140; 358/75, 358/77, 78, 80

[56] References Cited
UNITED STATES PATENTS

| | | | |
|---|---|---|---|
| 2,573,143 | 10/1951 | Jacob | 358/75 |
| 3,404,221 | 10/1968 | Loughren | 358/75 |
| 3,416,153 | 10/1968 | Hertz et al. | 346/75 |
| 3,553,371 | 1/1971 | Suenaga | 358/77 |
| 3,564,120 | 2/1971 | Taylor | 358/75 |
| 3,588,906 | 6/1971 | Van Brimmer | 346/75 |
| 3,626,459 | 12/1971 | Haflinger | 178/6.7 R |
| 3,673,601 | 6/1972 | Hertz | 346/75 |
| 3,745,243 | 7/1973 | Seitz | 358/78 X |

Primary Examiner—Joseph W. Hartary
Attorney, Agent, or Firm—Haseltine, Lake & Waters

[57] ABSTRACT

A liquid jet recorder including at least one nozzle which is connected to a pressure medium conduit for ejection of an electrically-conductive recording liquid onto a recording carrier, with at least one control electrode connected to a signal source for modulation of the liquid jet, and means for generating a relative motion between the nozzle and the recording carrier in two mutually perpendicular directions in the context of providing a linewise image recording. The recorder includes a pulse generator which is actuatable in synchronism with the relative movement between the nozzle and the recording carrier through displacement means for at least one of these components, and which transmits line and image point impulses to an image storage for an image distribution in image lines and image points, in which the image point information is stored in correspondence with the image distribution, and in which the image storage may be interrogated through the line and image point impulses for the stepwise further transmission of the image point information to a signal source.

6 Claims, 11 Drawing Figures

Fig. 2

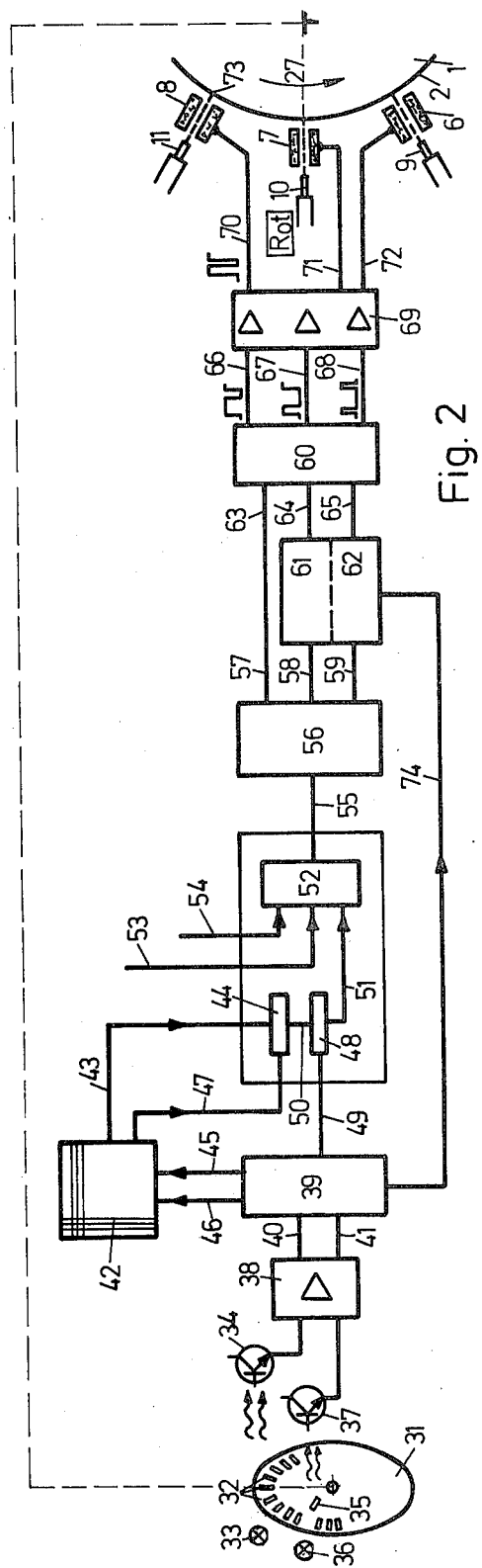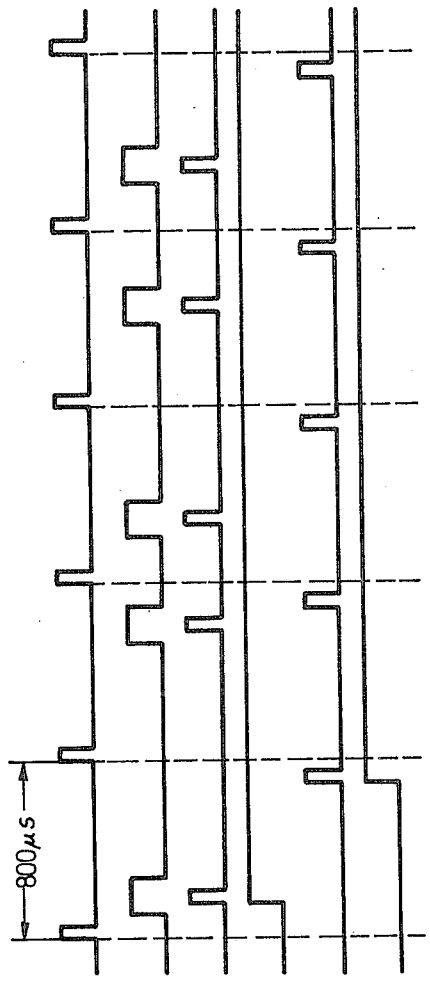
Fig. 2
Fig. 3
Fig. 4
Fig. 5
Fig. 6
Fig. 7
Fig. 8

LIQUID JET RECORDER

FIELD OF THE INVENTION

The present invention relates to a fluid or liquid jet recorder.

DISCUSSION OF THE PRIOR ART

A liquid jet recorder including at least one nozzle which is connected to a pressure medium conduit for ejection of an electrically conductive recording liquid onto a recording carrier, with at least one control electrode connected to a signal source for modulation of the liquid jet, and means for generating a relative motion between the nozzle and the recording carrier in two mutually perpendicular directions in the context of providing a linewise image recording, is described in German published specification No. 1,271,754 (U.S. Pat. No. 3,416,153). In this known liquid jet recorder it is possible to obtain modulation of the liquid jet between the nozzle and the recording carrier by applying a suitable voltage between the recording liquid and the control electrode. The known liquid jet recorder thus draws a picture on the recording carrier which is assembled from lines. In an embodiment of the known liquid jet recorder for effecting a linewise picture recording, the recording carrier is stretched or mounted on a rotatably supported drum. The drum is rotated about its axis by a motor in synchronism with the line impulses from an image transmitter, while concurrently being displaced in an axial direction. The unmodulated liquid jet impinges perpendicularly against the surface of the recording carrier. The image signal thereby is imparted to the control electrode for a linewise image recording.

Since the control of the drum is carried out through line impulses from an image transmitter, it is necessary that the signal delivered by the image transmitter be built up similar to that of a black-out and synchronizing signal of a video transmission installation. The image transmitter, in addition to means for generating the image signals, must also include means for generating the black-out and synchronizing signals. It is frequently desirable to receive with a liquid jet recorder of the above-mentioned type the information from an image storage. The image storage may thus be constructed as a storage matrix, in which the image information is storable by an image distribution in the form of image lines and image points. An image recording in the known liquid jet recorder can, in this instance, only be carried out when the image storage is augmented by an installation which delivers the line impulses and synchronizes the transmission of the image point information with the movement of the drum. The known liquid jet recorder, consequently, is not utilizable in connection with a usual image storage. For obtaining information from the usual image storage it is required to augment this by an installation for the delivery of synchronizing impulses.

SUMMARY OF THE INVENTION

Accordingly, it is an object of the present invention to provide a liquid jet recorder as described hereinabove, which facilitates that the image information of an image storage may be linewise recorded as image without the need for imparting circuitry changes to the image storage.

The object of the invention is inventively achieved by providing a pulse generator which is actuatable in synchronism with the relative movement between the nozzle and the recording carrier through displacement means for at least one of these components, and which transmits line and image point impulses to an image storage for an image distribution in image lines and image points, in which the image point information is stored in correspondence with the image distribution, and in which the image storage may be interrogated through the line and image point impulses for the stepwise further transmission of the image point information to a signal source.

In the invention, the synchronizing impulses are generated in the recorder itself and effect the interrogation of the image storage. The inventive liquid jet recorder is thus adapted to be connected to any usual image storage in which there is stored image information corresponding to an image distribution in image lines and image points.

BRIEF DESCRIPTION OF THE DRAWINGS

Further details of the invention may now be ascertained from the following detailed description of an exemplary embodiment thereof taken in conjunction with the drawings; in which:

FIG. 2 shows a circuit diagram of the electrical components of the liquid beam recorder of FIG. 1;

FIGS. 3 through 8 shows the voltage sequence for various operative positions of the circuit according to FIG. 2;

DETAILED DESCRIPTION

Figure 1:
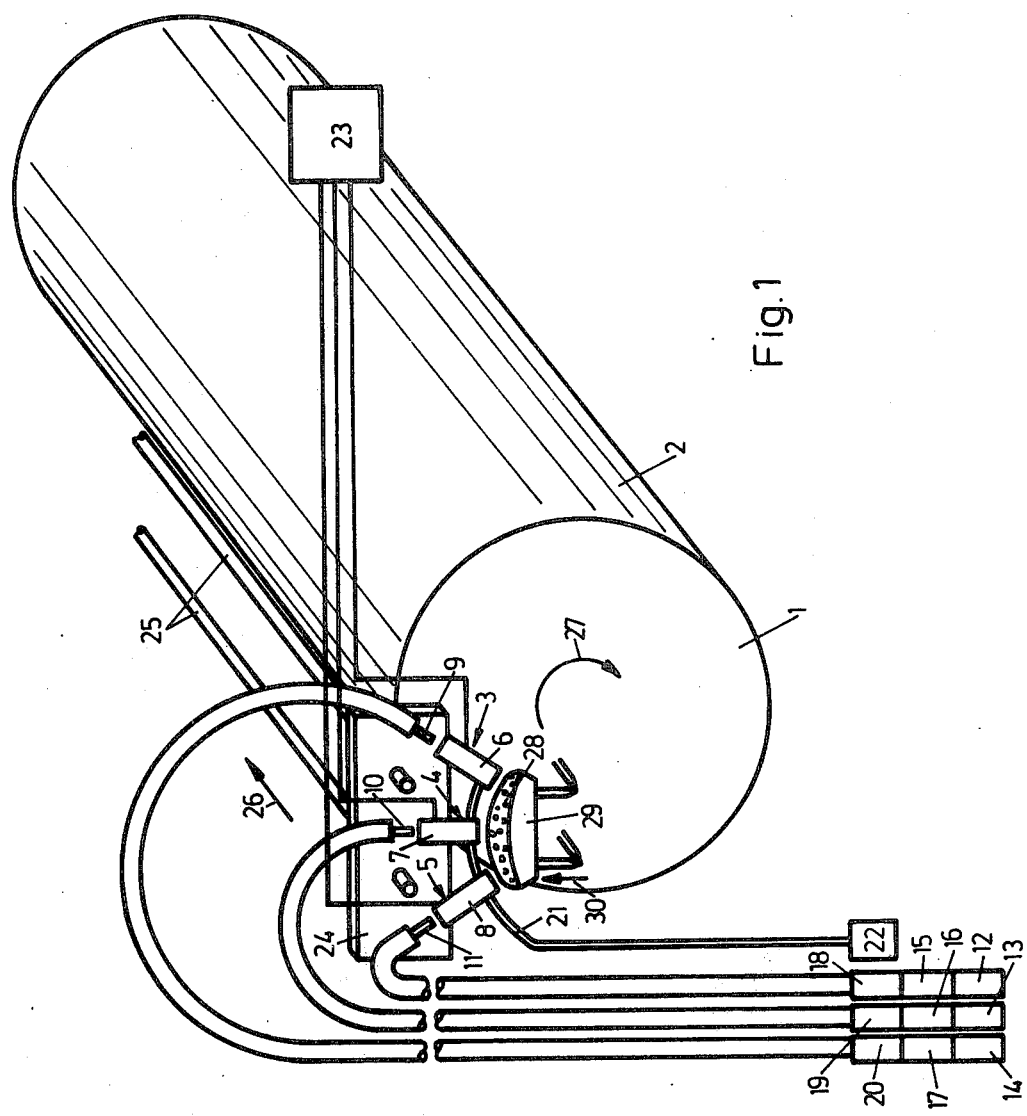
FIG. 1 shows a schematic representation of the liquid jet recorder constructed pursuant to the invention.

The fluid or liquid jet recorder, as shown in FIG. 1, includes a drum 1 on which there is stretched or mounted a recording carrier 2 constituted of a sheet of paper. For recording there are employed three recording or scribing systems 3 through 5 which, respectively, consist of a control electrode 6 through 8, and a jet nozzle 9 through 11. The jet nozzles 9 through 11 project the required recording liquid from supply receptacles 12 through 14 through the use of pumps 15 through 17, through the control electrodes 6 through 8. Between the jet nozzles 9 through 11 and pumps 15 through 17 there may also be, respectively, positioned pressure regulators 18 through 20.

The three recording systems serve for the recording or inscribing of three varied colors, for example, the colors blue, red and yellow, so that a colored image is inscribed on the recording carrier 2. The control electrodes 6 through 8 are passed through by the liquid jet ejected from jet nozzles 9 through 11. These liquid jets disintegrate into drops within the tubularly shaped control electrodes so that, upon application of a high voltage between the control electrodes and the recording liquid, there is produced a vapor cloud. The vapor cloud precipitates on the control electrodes, the latter of which are formed of a porous material, and are then aspirated by a suction conduit 21 through the intermediary of a suction pump 22. The control impulses for the control electrodes 6 through 8 emanate from a control installation 23. If a control impulse is lacking, then a color point is generated on the recording carrier 2; however, if a control impulse is present, then the flow of liquid between the respective jet nozzles 9 through 11 and the recording carrier 2 is interrupted.

The recording systems 3 through 5 are fastened onto a plate 24 which is longitudinally displaceably supported on two rails 25. The recording systems 3 through 5 and the plate 24, in the position shown in FIG. 1, are illustrated in their inactive position away from the recording carrier 2. The recording is carried out in a manner wherein the plate 24 is uniformly moved along rails 25 in the direction of arrow 26 over the entire length of the drum, while the drum 1 is uniformly rotated in the direction of arrow 27, or reversely. The recording thus is effected in a helix-like path on the recording carrier 2. The signals of the control installation 23 contain the image information.

After the completion of a recording or inscription, the plate 24 together with the recording systems 3 through 5, is again moved back into the illustrated inactive or initial position.

In order that residuals or excesses of the recording liquid may be removed from the recording systems 3 through 5, there is provided a suction pad 28 which is supported in a pan 29, and which is commonly associated with the control electrodes 6 through 8. The pan 29 is movable in the direction of arrow 30 in such a manner, whereby the suction pad 28 may be pressed against the jet outlet sides of the electrodes 6 through 8.

From FIG. 2 it may be ascertained that a disc 31 is fastened on the axis of drum 1, which is provided with slits 32 located on a circle concentric to the drum axis, and whose distances correspond to the distance of the image points in an image line. The slits 32 are passed through by the rays of a light source 33, whose light impinges on a phototransistor 34. The disc 31 further includes a slit 35 which is located on a radius different from the radius of slits 32, and which is passed through by the rays from a light source 36 whose light impinges on a phototransistor 37. Upon a rotation of drum 1, and consequently disc 31, the phototransistor 34 generates image point impulses, whose number is equal to the number of image points for each image line. The beginning of an image line is identified by an impulse of the phototransistors 37. This impulse is generated a single time for each rotation of the drum 2. The impulses of the phototransistors 34 and 37 are amplified in a preamplifier 38. The preamplifier 38 transmits input 40 picture point impulses to the input 40 of interrogation element 39, and line impulses to the input 41 thereof. The components 31 through 38 form a pulse generator which generates line and image point impulses in synchronism with the relative motion between the jet nozzles 9 through 11 and the recording carrier 2.

The receiver element 39 in a stepwise sequence interrogates the image information stored in an image storage 42. The image storage 42 which may, for example, be a matrix storage as indicated in FIG. 2, conveys the individual image point information to an interim storage 44 located in conductor 43, meaning interrogative impulses, image point impulses and line impulses transmitted to its inputs 45 and 46, so as to effect the output of image point information of sequentially following image points and image lines. In conductor 45 there may, for example, be carried out the line interrogation, and in conductor 46 the image point interrogation. The image storage 42 further delivers from its output 47 timing impulses for receiving the image point information at output 43. The interim storage 44 has a transfer storage 48 connected thereto, which is controlled by the timing impulses in conductor 49.

From FIGS. 3 through 8 there may be further ascertained the operation of the data interrogation. FIG. 3 illustrates the image point impulses in conductor 40, which correspond to the image pulses in conductor 46 and consequently the interrogation impulses for the image storage 42. Between two image point impulses there is provided a time period which is adequate for the delivery of the image point information through the image storage 42. This time consists of, for example, 800 microseconds.

In FIG. 4 there is represented, for example, the output of the image point information in the conductor 43. From FIG. 4 there may be ascertained that the image storage 42 between two image point impulses, respectively, transmits the image point information to the interim storage 44. The image point information is herein schematically illustrated by, respectively, a squarewave impulse. In actual practice, such a squarewave impulse is naturally inadequate, inasmuch as the image point information consists of a binary signal, for example, of a 5-bit or binary digit. Each square-wave impulse of FIG. 4 schematically replaces a binary signal of, for example, 5-bit.

FIG. 5 illustrates the voltage in conductor 47. The image storage 42, with each image point information, also delivers a timing impulse, which is represented in FIG. 5 by a small square-wave impulse. In accordance therewith, the output signal in the conductor 50 produced by the interim storage 44 is in accordance with the timing diagram of FIG. 6. The interim storage 44 stores each image point information until the commencement of the subsequent image point information. From FIG. 6 it may be ascertained that the signals for the first image point, which is a 5-bit binary signal, is applied for a longer time to conductor 15 than the image point signal for the second image point. It is thus ascertained that the time periods, during which the individual image point signals are applied to conductor 50, are different. So that these time periods become equal, the interrogation of the interim storage 44 is carried out by timing impulses pursuant to FIG. 7, which are generated in comparison with the spacing between two image point impulses, a short time preceding an image point impulse. Upon the occurrence of a transfer timing impulse pursuant to FIG. 7, the image point information is always available in the interim storage 44. The diagram pursuant to FIG. 8, in accordance therewith, shows the time periods during which the binary image point informations are applied to conductor 51. It is ascertained that these time periods are equally large.

In summation, with respect to the interrogation of the image storage 42, wherein the image storage 42 after commencement of an image point impulse must safely deliver within 700 micro seconds the image point information, it is ascertained that it is immaterial at which time point the image point information is delivered within this time interval, and that the particular time periods during which the image point information is present in conductor 51, are equally large. The image point informations are thus delivered at a fixed frequency by the transfer storage 48.

The image point informations in conductor 51 which, in conformance with the line and pointwise image distribution, represent the information of sequentially following image points, are transmitted to a multiplexer 52 to which there may be selectively transmitted test information through either a conductor 53 or a conductor 54, which is in the same code as the image point informations. The multiplexer 52 thus facilitates thereby to blend in a picture which is, for example, in alpha-numerical indicia, such as a patient's number, or to record a test image.

The output signal of the multiplexer 52, which herein again is a binary 5-bit signal for each image point in the illustrated embodiment, is transmitted through the conductor 55 to a color encoding installation 56. The color encoding installation 56 includes three outputs 57 through 59 which are associated with the three basic colors, yellow, red and blue. The input signal to the color encoding installation 56 characterizes for an image point the composition of these three colors, in effect, it signifies what percentage of yellow, red and blue components should be contained by each image point. The color encoding installation 56 generates at its output 57, 58 and 59 binary signals corresponding to the yellow, red and blue components. For this purpose three bit are sufficient.

The yellow signal in conductor 57, which controls the liquid of the first jet nozzle 11 shown in the recording direction, is directly transmitted to a liquid quantity-control installation 60, whereas the output signals in conductors 58 and 59 for the subsequent jet nozzles 10 and 9 are transmitted through slide registers 61 and 62 to the liquid quantity-control installation 60. The liquid quantity-control installation 60 forms impulse sequences from the signals received at its inputs 63 through 65, whose impulse sequence frequency remains constant, but whose control ratio varies in conformance with the proportion of the three colors, yellow, red and blue. The larger the proportion of one of the colors, the smaller is the control ratio, in effect, the ratio of an impulse to the subsequent pause. The color yellow has associated therewith the output conductor 66, the color red the output conductor 67, and the color blue the output conductor 68. The signals in these conductors, through a high voltage switch 69, control the conveyance of the recording liquid from the jet nozzles 9 through 11 to the recording carrier 2. In accordance therewith, the high-voltage signals, whose impulse amplitudes are constant, are transmitted through the conductors 70 through 72 to the control electrodes 6 through 8. The jet nozzle 9 thereby ejects blue, the jet nozzle 10 red, and the jet nozzle 11 yellow colored recording liquid.

If a high-voltage impulse is applied to one of the electrodes 6 through 8, this will effect that the liquid jet ejected from the associated jet nozzle disintegrates into a vapor cloud which precipitates onto the electrode, and may then be aspirated therefrom. This will also provide for an interruption in the liquid jet. For each image point, the associated image point information, in effect, the high-voltage impulse having a control ratio corresponding to a respective image point information, is applied to the control electrodes 6 to 8 during a time interval between two point impulses, namely for example, during 800 microseconds. The smaller the control ratio, the more intensively is it colored through the particular recording liquid.

In the illustrated exemplary embodiment, each of the nozzles 9 through 11 is directed towards another point on the recording carrier 2 within an image line. Between the contact points of the liquid jets of nozzles 9 and 10, as well as 10 and 11, there are located respectively 24 image points. The drum rotates in the direction of arrow 27, and the color yellow is immediately sprayed through nozzle 11 in the presence of image point information which is associated with image point 73. The slide registers 61 and 62 have the image point impulse sequence pursuant to FIG. 3 transmitted thereto by the interrogation element 39 through the conductor 74, so that the slide registers 61 and 62 are switched further in a stepwise manner in correspondence with this impulse sequence. After 24 impulses there is reached the capacity of the slide register 61, in effect, this slide register has been switched so far that the red color information of the image point 73, whose yellow color information has been recorded previously for 24 image points, is transmitted to the liquid quantity-control installation 60. When the point 73 is positioned opposite the jet nozzle 10, the associated impulse sequence for the red color component is imparted to the control electrode 7, and the red color component is sprayed. After a further 24 image points, in effect, after 48 image points, as calculated from the location of image point 73 in FIG. 2, the image point 73 reaches the jet nozzle 9. Concurrently, the associated blue color information is imparted to the control electrode 6, and the blue color component is sprayed, since the capacity of slide register 62 has been reached.

The slide registers 61 and 62 form delay elements which effect that the individual color components for an image point are always sprayed when the image point is located opposite of the associated jet nozzle. The illustrated embodiment enables a suitable constructive configuration to be applied to the recording carriage with the nozzles 9 through 11. Within the scope of the invention, it is also possible that all colors for an image point may be currently sprayed when the liquid jets of jet nozzles 9 through 11 are directed towards a single point on the recording carrier 2. The illustrated stepped inscribing of the colors to an image, however, facilitates the good positioning of the nozzles on the recording carriage.

The input signal of the color encoding unit 56, in a parallel manner, again provides the color composition of an image point formed of three colors. Conductor 57 is basically available for the yellow color, conductor 58 is basically available for red, and condutor 59 is basically available for blue. The binary keyed 3-bit component of the particular color may be programwise varied through an exchange of the installation 56 with another. Thus, for example, an image point which in one instance may be formed of 30% red and 70% yellow, while the same image point in another case may be 40% blue and 60% yellow. It is also possible that the color composiiton of the image may be varied through an exchange of the color encoding installation 56 with another correspondingly programmed color encoding installation.

The invention is described herein in connection with a three-color recorder. Within the scope of the invention it is, however, also possible to employ only a single color for the inscribing or recording of an image. In this case, the color encoding installation 56 may be omitted. Furthermore, a liquid quantity-control installation 60 having a single passageway, will be sufficient.

It is, however, principally also possible to employ only two, or more than three colors, for the recording of an image. In the last instance, the circuit arrangement according to FIG. 2 must be correspondingly amplified. For a corresponding actuation of the additional color jet nozzles it is required to employ added slide registers for the delay of the signals for the additional color jet nozzles.

The described liquid jet recorder facilitates that the colors of an image point may be successively inscribed or recorded without the need for employing a calculator in the image storage 42 for calculating the signals which are to be applied to the electrodes 6 and 7. The delay of these signals is effected by means of the slide registers 61 and 62. A standard image storage utilized as a data generator is consequently adequate for the recording of a colored image.

The described liquid jet recorder is adapted, for example, for recording of a scintillation diagram utilized in nuclear medicine, wherein preterminal image colors are associated with predetermined ranges of radiation intensity. The arrangement of these image colors, meaning the programming thereof, may herein be varied by an exchange of the color encoding installation 56.

The signal in conductor 55 consists of a 5-bit-parallel information. This signifies that up to $2^5 = 32$ coloring steps can be provided. The individual color steps are obtained in the above described manner through admixing of the three basic colors, yellow, red and blue. The 5-bit binary signal associated with an image point is converted into three 3-bit binary signals, meaning that for each basic color there are 3 bits available. For each basic color there are thus provided $2^3 = 8$ coloring steps, which may be admixed with each other as desired. The total number of coloring steps, naturally, remains limited to 32. The color encoding installation 56 may be constructed of an integrated module which, through use of a plug connection, may be interchanged at any time with a differently programmed module.

The liquid quantity-control installation 60 contains seven impulse generators, each of which has a different impulse width, in which, however, the impulse sequence frequency of the output impulses is equal. By means of the input information, the required impulse generator is selected and the frequency thereof applied to the output. If at any of the imputs 63 to 64 there appears a signal which indicates that this color should not be sprayed at an image point, then none of the generators are selected (white color step, so that during 800 microseconds a continuous high-voltage is applied to the respective control electrode.

With respect to the displacement means mentioned hereinabove, in the described embodiment this refers to an electro-motor which rotates drum 1, which also rotates the disc 31 so as to generate the image point and line impulses.

Figure 9:
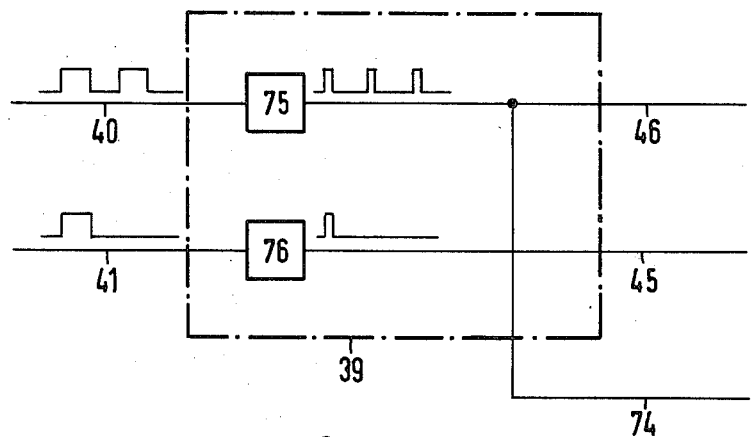
FIG. 9 illustrates diagrammatically the interrogating element of the circuit of FIG. 2.

The construction of the interrogating element 39 is illustrated in FIG. 9. FIG. 9 shows the two inputs 40 and 41 of the interrogating element 39, to which are transmitted square-wave impulses, which emanate from the transistors 34 and 37. At the input 40 are applied the image point impulses, and at the input 41 the line impulses. The inputs 40 and 41 in the interrogating element 39 lead to two impulse formers 75 and 76 which, at the commencement of each respectively input impulse, generate a needle impulse at the inputs 40 and 41. The output impulses of the impulse formers 75 corresponds to the impulse sequence shown in FIG. 3, and effect the pointwise interrogation of the image storage 42, while the line interrogation is carried out through the needle impulses at output 45. In the interrogating element 39 there is also provided a junction by means of which the needle impulses are transmitted to the conductor 74, at the output of the impulse former 46, and thereby transmitted to the slide registers 61 and 62.

Figure 10:
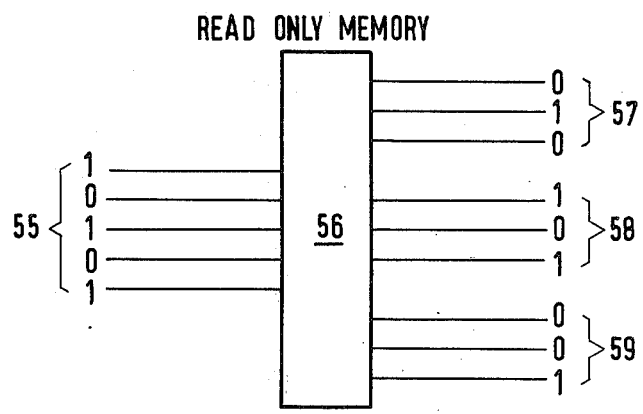
FIG. 10 illustrates the color encoding arrangement of the circuit of FIG. 2.

From FIG. 10 it may be ascertained that the color encoding installation 56 is a programmable "read only" memory. It includes five input conductors which correspond to the input 55, and three groups each having respectively three output conductors which correspond to the outputs 57, 58 and 59. A 5-bit signal at the input 55 is thus converted into three 3-bit signals at the outputs 57 through 59 in conformance with the programming of the "read only" memory 56. In FIG. 10 there is illustrated an example of a possible programming, which provides the conversion of a 5-bit signal into three 3-bit signals.

Figure 11:
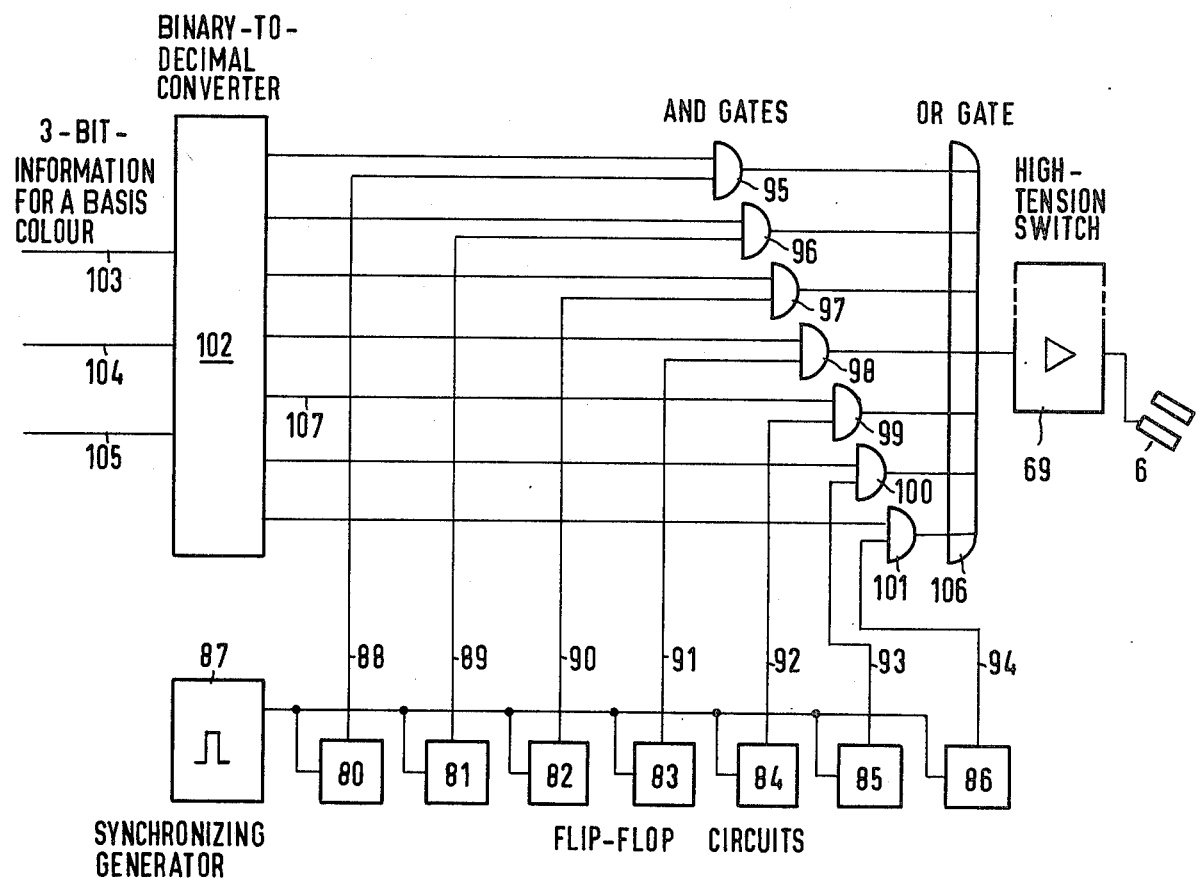
FIG. 11 illustrates in detail the control channel for the basic color "blue" employed in the inventive recorder.

The construction of the control installation 60 may be more accurately ascertained from FIG. 11. FIG. 11 shows seven impulse generators 80 through 86, which are monostable stepping oscillators, The stepping oscillators are commonly switched over by means of a pulse generator 87. They possess different time constants and thereby again tilt back in accordance with different times, as calculated from the end of a timing impulse. Consequently, impulse sequences are obtained at the outputs 88 through 94 of the stepping oscillator 80 through 86, which possess the same frequency but different control ratios.

In FIG. 11 there is illustrated the control channel for only the basic color blue. The control passageways for the basic colors red and yellow are constructed similar to this control passageway. The output impulses of the stepping oscillators 80 to 86 are transmitted to the inputs of AND-gates 95 through 101. The other inputs of these AND-gates are connected to a binary-decimal converter 102 which includes three input conductors 103 through 105 to which there are applied a 3-bit information for a basic color. The three input conductors 103 and 105 thus correspond to the conductor 65 in FIG. 2. A 3-bit signal is applied to inputs 103 through 105, which characterizes the intensity of the basic color blue for an image point. This signal is so processed in the binary-decimal decoder 102 so that a signal appears at one of the seven outputs of the binary-decimal decoder 102. The seven outputs of the binary-decimal decoder 102 accordingly correspond to the seven intensity steps for an image point and one basic color.

The AND-gates 95 through 101 have an OR-gate 106 connected thereto, for controlling the high-voltage switch 69 which is connected to the electrode 6.

It is assumed that the 3-bit information at the inputs 103 through 105 corresponds to an output signal at output 107. In accordance therewith, the AND-gate 99 is opened and the impulse sequence of the stepping oscillator 84 is transmitted through the OR-gate 106 to the high-voltage switch 69. During a recording time which is the same for all image points, the impulse sequence transmitted by the stepping oscillator 84 is applied to the high-voltage switch 69, and the color blue is recorded on an image point at an intensity which is determined by the control ratio of the impulse sequence of the stepping oscillator 84.

Also the basic colors red and yellow have each associated therewith a binary-decimal decoder which, in the described manner, is connected together with AND-gates and an OR-gate. The output conductors 88 through 94 are conducted in parallel to the inputs of two further groups of respectively seven AND-gates, whose other inputs, respectively, lead to a further binary-decimal decoder.

For each signal at the inputs 103 through 105 of the binary-decimal decoder 102 there is thus selected one of the stepping oscillators 80 through 86, and the image color is inscribed or recorded at an intensity which is determined by the control ratio of the selected stepping oscillator.

While there has been shown what is considered to be the preferred embodiment of the invention, it will be obvious that modifications may be made which come within the scope of the disclosure of the specification.

What is claimed is:

1. In a liquid jet recorder having a recording unit including a plurality of jet nozzles for producing a plurality of basic colors; a pressure means conduit connected to said jet nozzles for causing the latter to each concurrently propel a jet of an electrically conductive recording liquid onto a recording carrier; a control electrode for modulating each said liquid jet; and actuating means for producing relative movement between said jet nozzles and said recording carrier in two mutually perpendicular directions for producing a linewise image recording, the improvement comprising: a pulse generator for generating line and image point impulses being connected to said recording carrier; an image storage means connected to said pulse generator, said pulse generator being actuatable in synchronism with the relative movement between said jet nozzles and said recording carrier in dependence upon said actuating means for at least one of said elements; means for receiving the line impulses and image point impulses from said pulse generator and transmitting said impulses to said image storage means in conformance with an image distribution in image lines and image points, said image storage means storing said image point information in conformance with said image distribution; means for having said line impulses and image point impulse stepwise interrogate said image storage for conveying said image point information; a color encoding arrangement for receiving each said image information determinative of the color composition of an image point, said color encoding arrangement including a plurality of outputs corresponding to the number of said basic colors; and said control electrodes being connected to said output so as to generate color and intensity image point information on said recording carrier.

2. A recorder as claimed in claim 1, comprising a rotatbly supported drum, said recording carrier being mounted on said drum; said actuating means including means for providing relative movement between said jet nozzle and said drum in the longitudinal direction relative to said drum axis; a disc coaxially fastened to said drum and being rotatable therewith, said pulse generator being formed by said disc, said disc including a plurality of equally spaced image point impulse generators concentrically circularly spaced about said drum axis, and a line impulse generator for delivering one line impulse for each rotation of said drum.

3. A recorder as claimed in claim 1, comprising a second impulse generator; and a multiplexer for selectively connecting said color encoding arrangement to said image storage means and to said second pulse generator.

4. A recorder as claimed in claim 1, comprising a plurality of differently programmed color coding arrangements, said first-mentioned color encoding arrangement beiing operatively interchangeable with each of said differently programmed color coding arrangements.

5. A recorder as claimed in claim 1, each said nozzle being directed towards a different image point located on a single line on said recording carrier, comprising delay elements located intermediate the outputs of said color encoding arrangement which are associated with the subsequent nozzle following the first nozzle in the recording direction, said delay elements having preselected delay periods whereby each said nozzle sprays the color and color intensity associated with an image point when said image point is located below said nozzle.

6. A recorder as claimed in claim 5, said delay elements comprising slide registers adapted to be stepwise displaced in response to said image point impulses, each said slide register having a capacity corresponding to the number of image points intermediate the contact locations for the liquid jets of said nozzles.

* * * * *